Oct. 20, 1925.
J. J. LIBI
SAFETY RAZOR
Filed May 6, 1925
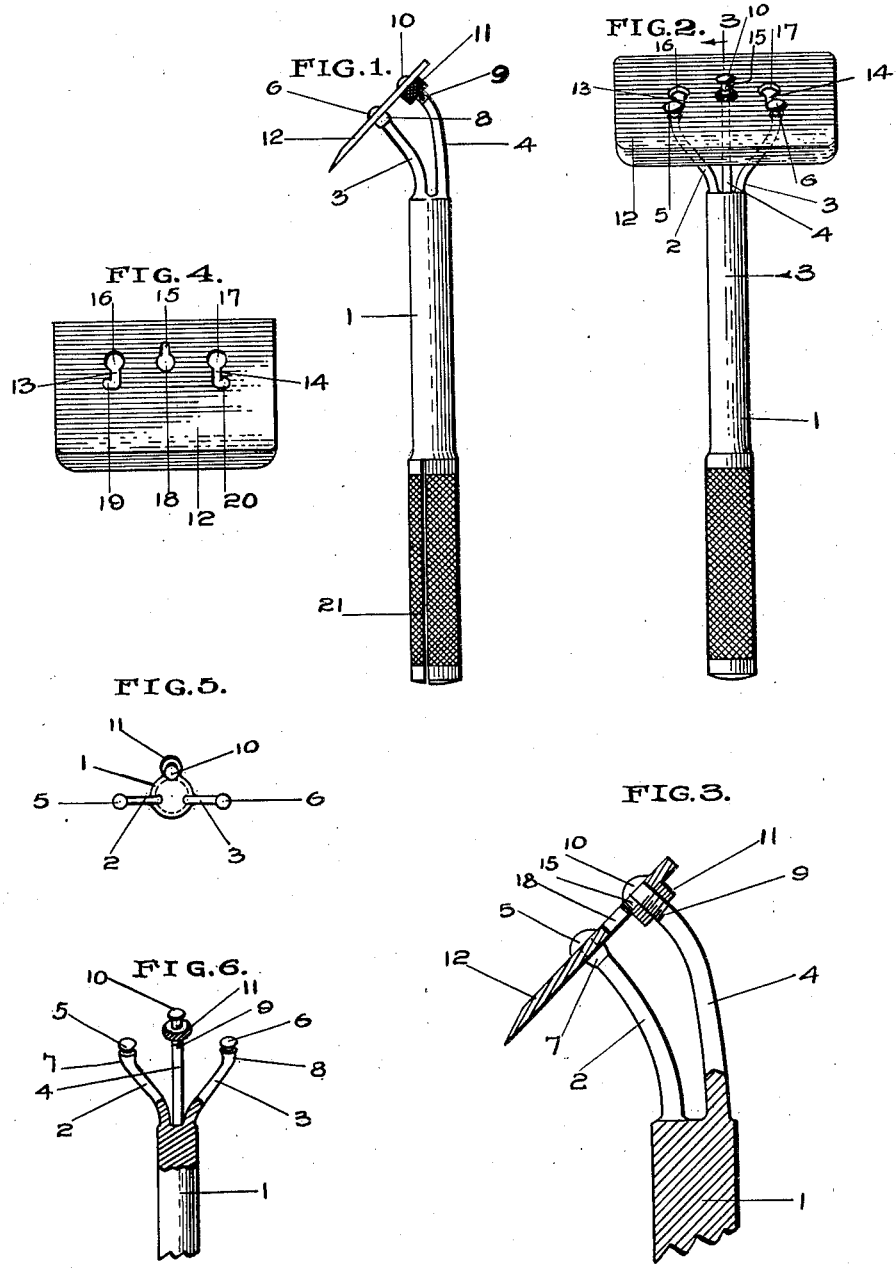
INVENTOR
JOHN J. LIBI.
BY
ATTORNEY

Patented Oct. 20, 1925.

1,558,021

UNITED STATES PATENT OFFICE.

JOHN J. LIBI, OF SAN FRANCISCO, CALIFORNIA.

SAFETY RAZOR.

Application filed May 6, 1925. Serial No. 28,331.

*To all whom it may concern:*

Be it known that I, JOHN J. LIBI, citizen of the United States, residing at San Francisco, in the county of San Francisco and State of California, have invented certain new and useful Improvements in Safety Razors, of which the following is a specification.

This invention relates to razors, and more particularly to safety razors of a character provided with improved means for clamping and holding the razor blade in rigid position for use, from which it may be readily and instantly detached by simply releasing the clamping means and compressing the engaging spring-tines forming the retaining means.

The tines forming the blade retaining means may be constructed as integral parts of the handle, or of separate material and inserted in the handle, with provisions for permanently securing them thereto.

The blade is provided with a plurality of slots, preferably three in number, of particular construction and adapted to receive the tines when properly compressed for registration with their respective tines, the tines, after entrance and release, assuming normal positions and resting in narrower and angularly extending openings communicating with the entrance slots, in which they are securely held by the spring-urge of the tines themselves and clamped by a small nut carried by one of the tine shanks and adapted to be screwed tightly against the inner side of the blade.

The principal object of the invention is to provide a safety razor of simple, cheap and durable construction, and of a character permitting ready and easy attachment and detachment of blade, and that will, during the shaving operation, rigidly and securely retain the blade in position.

Other objects and advantages will appear with reference to the subjoined specification, and accompanying one sheet of drawings, forming a part thereof, and in which similar characters of reference refer to like parts, throughout.

Figure 1 is an edge view of a safety razor embodying the principles of my invention;

Figure 2 is a front elevation of the same;

Figure 3 is an enlarged sectional detail of the upper end of the razor handle, tines, and razor blade with its registering slots as formed, taken on line 3—3 of Figure 2;

Figure 4 is a plan view of the razor blade, showing the tine engaging slots adapted for the reception of the tine heads and the angularly arranged seats adapted for the retention of the tines in position;

Figure 5 is a top plan view of the handle and tines, showing the arrangement of the tines in normal unsprung positions; and Figure 6 is a front elevation, partly in section, showing the positions of the tines with respect to the handle, when in their normal, or unsprung, positions, as shown in Figure 2.

Referring more particularly to the drawings, my improved razor is comprised of the ordinary handle 1, which may be of solid or tubular construction, bearing tines, which, for convenience of illustration, are shown in the drawings as integral parts of the handle, with the handle of hollow, or tubular, construction.

The forward end of the handle 1 is provided with a plurality of integrally formed retaining and positioning tines, preferably three in number, as shown, comprised of the laterally extending bracing tines 2 and 3 and a centrally positioned tine 4.

The tines 2 and 3 extend both laterally and forwardly and terminate in heads 5 and 6 and are provided, adjacent these heads, with shoulders 7 and 8, the necks therebetween being of a length corresponding to the thickness of the razor blade.

The tine 4 extends upwardly and forwardly, also, but of a length slightly greater than that of its companion tines 4 and 5, to provide for the required cant, or inclination, of the razor blade when adjusted for use, and is provided with a threaded portion 9 adjacent the head 10 thereof, for the accommodation of a knurled clamping nut 11, intended to be screwed tightly against the underside of the blade 12 to jam it securely and firmly against the tine heads, 5, 6 and 10, as shown in Figures 1 and 2.

The blade 12 is provided with a plurality of transversely arranged slots 13, 14 and 15 having openings 16, 17 and 18 of sufficient diameter to permit entrance of the heads 5, 6 and 10 of the tines 2, 3 and 4 upon their slight compression.

The blade slots 13 and 14 are provided with angularly arranged communicating openings 19 and 20 positioned opposite the openings 16 and 17 and extending in reverse directions in the blade and of the same diameter as the slots 13 and 14 and adapted to accommodate those portions of the tines 2 and 3 lying between the heads 5 and 6 and the shoulders 7 and 8 thereof.

Normally, when detached from the blade, the tines 2, 3 and 4 tend to maintain positions approximately those assumed when in their relative positions in the slot openings 19 and 20 and slot 15, therefore, in assembling the blade 12 and the handle 1, the tines 2, 3 and 4, being of resilient material, are slightly compressed between the thumb and fingers so that the heads 5, 6 and 10 thereof will register with the openings 16, 17 and 18 of the slots and, upon their subsequent release, will expand slightly, thereby allowing the tines 2 and 3 to seat in the openings 19 and 20 and the tine 4 to rest in the rear end of the slot 15.

In order to assure rigidity between the blade 12 and the handle 1, the nut 11 is tightened against the underside of the blade, as shown in Figures 1 and 3, thereby securely clamping the blade against the respective heads of the tines 2, 3 and 4.

The rearward end of the handle 1 may be provided with a blade kerf 21 adapted for the reception of the blade, for convenience in sharpening or honing.

The tines are, preferably, circular in cross-section, though they may be stamped of rectangular material and apart from the handle, to which they may be attached in any suitable manner.

Having thus described my invention, I claim, and desire to secure by Letters Patent:

1. A razor comprising, in combination, a handle bearing resilient blade-engaging tines, and a blade provided with slots adapted to be engaged by said blade-engaging tines, one of said tines bearing locking means adapted for engagement with the blade, said tines being adapted to normally engage and rest in the blade slots and, upon compression, to be removed therefrom.

2. A razor comprising, in combination, a handle bearing a plurality of resilient blade-engaging tines, a blade provided with openings so disposed as to register with said engaging tines when the tines are compressed, slots provided with seats and communicating with said openings and adapted to receive said tines and permit their expansion to normal positions, and a locking means borne by one of said tines and adapted for adjustment to clamp the blade securely upon said tines.

3. A razor comprising, in combination, a handle bearing a plurality of resilient blade-engaging tines, two of which are provided with heads and shoulders and the other with a head and a clamping nut, all being possessed of an arrangement and inclination adapted to give a proper cant to a razor blade, a blade provided with openings adapted for registration with said engaging tines, when said tines are compressed, and having slots communicating therewith bearing offset rests adapted to receive said tines and to allow of the subsequent expansion thereof to normal position and the locking of the blade to the tines and handle upon the adjustment of the said clamping nut to position against the blade.

In testimony whereof I have affixed my signature.

JOHN J. LIBI.